US 6,583,984 B2

(12) United States Patent
Yin et al.

(10) Patent No.: US 6,583,984 B2
(45) Date of Patent: Jun. 24, 2003

(54) MULTI-POSITION COMPUTING DEVICE DOCKING STATION

(75) Inventors: Memphis Zhihong Yin, Corvallis, OR (US); Glen A Oross, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 09/816,888

(22) Filed: Mar. 23, 2001

(65) Prior Publication Data

US 2002/0135977 A1 Sep. 26, 2002

(51) Int. Cl.$^7$ .............. G06F 1/16; H05K 7/16
(52) U.S. Cl. .......... 361/686; 361/683; 361/727; 361/801; 16/343
(58) Field of Search ............... 361/679–686, 361/724–727, 753, 801; 16/342, 368, 343; 312/223.1–223.3; 248/917, 920–924

(56) References Cited

U.S. PATENT DOCUMENTS

| 5,100,098 A | * | 3/1992 | Hawkins ............... 248/291.1 |
| 5,452,180 A | * | 9/1995 | Register et al. ............. 361/686 |
| 5,619,397 A | * | 4/1997 | Honda et al. ............... 361/686 |
| 5,633,782 A | * | 5/1997 | Goodman et al. .......... 361/683 |
| 5,687,060 A | | 11/1997 | Ruch et al. ................ 361/686 |
| 6,091,602 A | | 7/2000 | Helot ......................... 361/686 |
| 6,185,096 B1 | * | 2/2001 | Helot et al. ................ 361/686 |

* cited by examiner

Primary Examiner—Jayprakash N. Gandhi
(74) Attorney, Agent, or Firm—Jeff D. Limon

(57) ABSTRACT

A docking station that accepts a portable computing device is disclosed. The docking station comprises a first surface that supports a bottom surface of the portable computing device. The first surface includes a means for restricting the movement of the portable computing device. The docking station additionally includes a body or a trunk that interfaces the portable computing device with an external device. The docking station additionally includes a hinge which joins the first surface to the body or trunk, in which the hinge permits the portable computing device to be rotated between a horizontal and a vertical orientation as well as various acute angles.

14 Claims, 5 Drawing Sheets

MULTI-POSITION COMPUTING DEVICE DOCKING STATION

BACKGROUND OF THE INVENTION

The invention relates generally to the field of computing devices, and, more particularly, to docking stations used with portable computing devices.

As computing devices become more and more indispensable in business and home environments, the need for physical space, such as the desktop area upon which the computing device can be operated, correspondingly increases. This problem is exacerbated in many modern business environments where cubicles and offices, as well as the desks within these, become smaller and smaller in order to lower costs and to increase the overall efficiency of the enterprise. As desk space decreases, the need for computing devices that consume a smaller amount of desktop space increases.

Advances in reducing the size of portable computing devices, such as laptop computers, handheld computing devices, and so forth, offer a partial solution to increasing available desk space when total desk space has been reduced. Indeed, as functions previously performed only in larger computers can now be performed using much smaller and more portable computing devices, these advances enable users to do more computing using less desk space. However, one aspect of the contemporary home and business-computing environment that remains relatively unchanged is the size of the docking station used to provide network connectivity and additional display capability to a portable computing device. In recent years, the size of the docking station used with a portable computing device has not been significantly reduced in size.

Therefore, a multi-position portable computing device docking station is highly desirable. Such a docking station would allow a more efficient use of desk space, thus enhancing the appeal of portable computing devices in both home and business-computing environments.

SUMMARY OF THE INVENTION

The invention is pointed out with particularity in the appended claims. However, at least some important aspects of the invention are summarized herein.

According to one aspect of the invention, a docking station is adapted to accept a portable computing device. The docking station includes a first surface that supports a bottom surface of the portable computing device. The first surface preferably includes means for restricting movement of said portable computing device. The docking station also includes a body that houses any electronics that interface said portable computing device to an external device. Further, the docking station includes a hinge that joins the first surface to the body, wherein the hinge permits the portable computing device to be rotated between a horizontal and a vertical orientation.

According to another aspect of the invention, a method for positioning a portable computing device on a multi-position docking station is provided. The method includes sliding the portable computing device along a substantially horizontal surface of the multi-position docking station. The portable computing device is then retained on the horizontal surface. The portable computing device is then rotated toward a substantially vertical orientation by way of a hinge or rotary joint that couples the substantially horizontal surface to a body, wherein the body includes electronics that interface the portable computing device to an external device.

A more complete understanding of the various aspects of the claimed invention can be acquired by reading this specification, in conjunction with the figures, in which like reference numerals refer to like elements.

DESCRIPTION OF THE PREFERRED EMBODIMENTS

A multi-position device docking station enables a portable computing device to consume reduced desktop area and thus be operated in business and home computing environments that offer only limited desktop area. This allows a user to make use of the portable computing device in the traditional manner, in which the device is inserted into a docking station and operated while oriented horizontally, as well as allowing the user to use the portable computing device with a separate keyboard and display while the portable computing device is oriented vertically. Further, the body of the portable computing device can be vertically oriented while the computer display is allowed to rotate about the body. This allows the user to view the display in a more ergonomic manner and to make further adjustments in the display viewing angle by rotating the display about the body of the computing device.

Through the use of the multi-position device docking station, the portable computing device can be efficiently and ergonomically used in many business and home computing environments where desktop space is limited. The use of the docking station is further advantageous since the monitor stand that supports the desktop CRT can be removed. This makes the user more comfortable when viewing the screen, since the monitor can be designed without a monitor stand. These savings can be passed on to the user.

Figure 1:
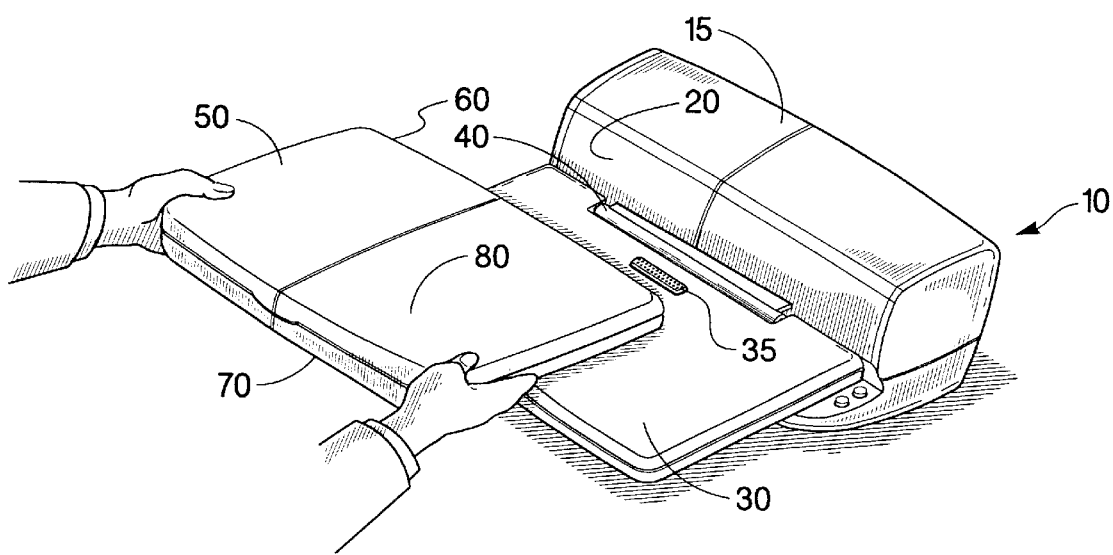
FIG. 1 is an illustration of a user bringing a portable computing device in contact with a multi-position computing device docking station in accordance with a preferred embodiment of the invention.

FIG. 1 is an illustration of a user bringing a portable computing device into contact with a multi-position computing device docking station in accordance with a preferred embodiment of the invention. In FIG. 1, a user is shown inserting portable computing device 50 into multi-position computing device docking station 10. FIG. 1 also shows connector 35 located first surface 30 of docking station 10. This allows, portable computing device 50 to desirably receive signals from and transmit signals to docking station 10 by way of connector 35.

When the user interfaces portable computing device 50 to docking station 10, the computing device is slid or placed upon first surface 30 of the docking station. Typically this contact is made by way of bottom surface 70 of computing device 50 of FIG. 1. Desirably, first surface 30 includes grooves, guides, or other means for receiving bottom surface 70 of portable computing device 50.

As portable computing device 50 is brought into contact with connector 35, end portion 60 of the computing device is brought closer to rear wall 20 of docking station 10. Preferably, as computing device 50 is mated with connector 35, the user secures the device in place by way of a hook, clamp, clasp, or other retaining means that is designed to restrict the movement of portable computing device 50 while the device is in contact with docking station 10. It is anticipated that this brought about by way of the hook, clamp, or clasp binding to a recessed cavity on bottom surface 70. Thus, although not shown in detail in FIG. 1, it is anticipated that docking station 10 incorporates a means for restricting the movement for portable computing device on first surface 30 of docking station 10 in accordance with conventional techniques.

In a preferred embodiment, hinge 40 of FIG. 1 is used to rotate both portable computing device 50 and first surface 30 of docking station 10 from a substantially horizontal toward a substantially vertical orientation. Desirably, the rotation of computing device 50 stops when the device is aligned vertically, or when top surface 80 comes into contact with body 15 of docking station 10. This enables the user of portable computing device 50 to operate the device in either a horizontal or vertical orientation.

Figure 2:
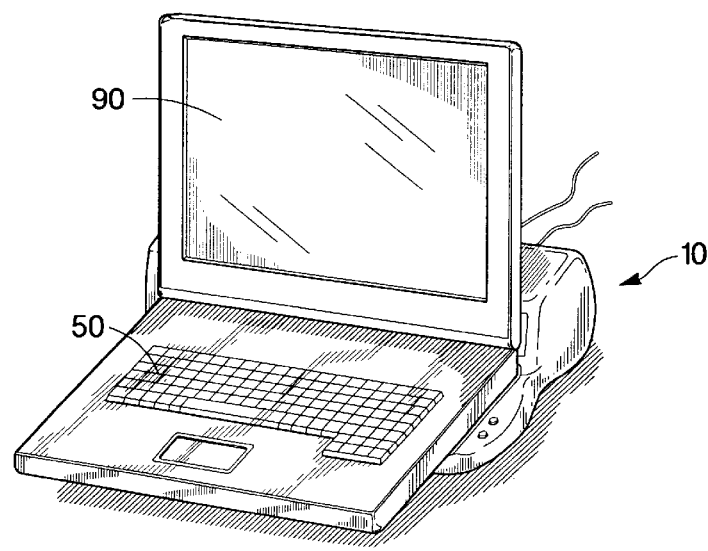
FIG. 2 is an illustration of the portable computing device of FIG. 1 into contact with the multi position computing device docking station of FIG. 1 in accordance with a preferred embodiment of the invention.

FIG. 2 is an illustration of the portable computing device (50) of FIG. 1 in contact with the multi-position computing device docking station (10) of FIG. 1 in accordance with a preferred embodiment of the invention. In FIG. 2, portable computing device 50 is shown in a configuration that allows its operation by a user. In FIG. 2, display 90 as well as the keyboard of computing device 50 are shown in their conventional operating positions. Operation of portable computing device 50 of FIG. 2 is consistent with a typical desktop computer user model.

Figure 3:
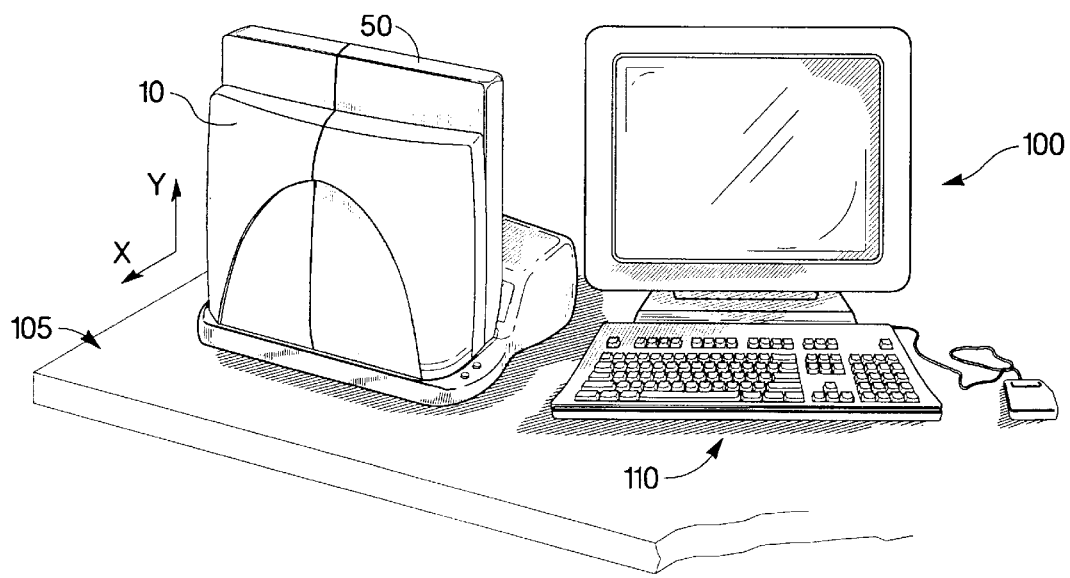
FIG. 3 is an illustration of the portable computing device of FIGS. 1 and 2 oriented vertically using the multi position portable computing device docking station of FIGS. 1 and 2 in accordance with a preferred embodiment of the invention.

FIG. 3 is an illustration of the portable computing device of FIGS. 1 and 2 oriented vertically using the multi-position portable computing device docking station of FIGS. 1 and 2 in accordance with a preferred embodiment of the invention. In FIG. 3, portable computing device 50 is shown as being oriented vertically, at an angle of approximately 90 degrees to horizontal desktop 105. In this configuration, maximum desktop area is made available for display 100, as well as keyboard 110. Display 100 and keyboard 110 represent separate display and keyboard resources aside from those of computing device 50.

The use of computing device 50 when oriented vertically is preferred by many users who are more comfortable with (Cathode Ray Tube) CRT screens and external keyboards as opposed to the display and keyboards provided with many portable computing devices. Because of the vertical orientation of portable computing device 50, the device and its associated docking station (10) consume only minimal desktop space while allowing the user to use the device to interface with an external display, keyboard, or to interface with a peripheral device such as a printer, digital camera, or scanner. This allows the display 100 to be placed directly on horizontal desktop 105, thus eliminating the need for a stand to support the display.

Figure 4:
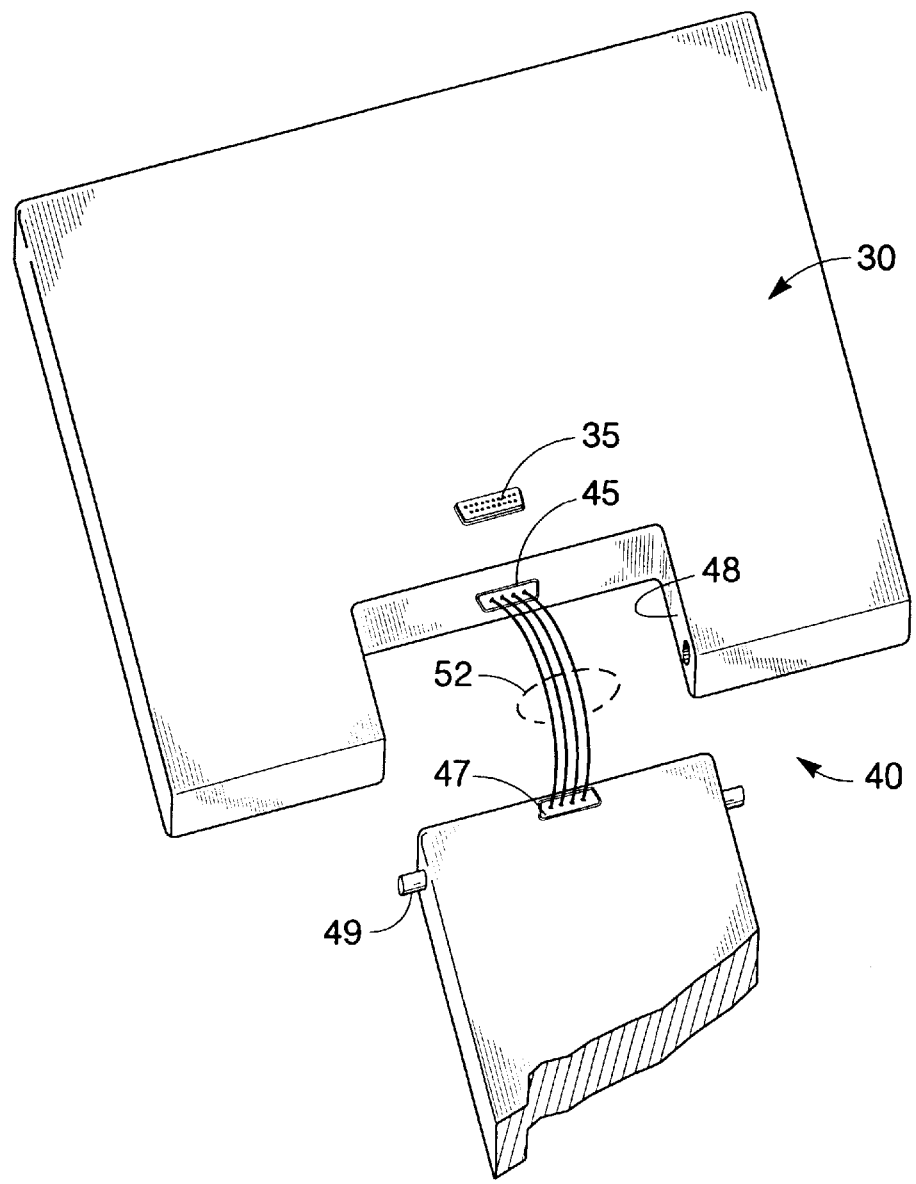
FIG. 4 is an illustration of a first surface of the docking station of FIGS. 1–3 in accordance with a preferred embodiment of the invention.

For added flexibility, computing device 50 can be operated at a position in which portable computing device 50 is oriented at an acute angle with horizontal desktop 105, such as an angle of 45 degrees. Preferably, this capability is brought about through the use of a hinge or a rotary joint that incorporates a ratchet or other means, such as friction, that enables portable computing device 50 to be positioned at a variety of acute angles. This added flexibility can be beneficial when vertical clearance is at a premium as well as horizontal area on horizontal desktop 105. FIG. 4, herein, describes hinge 40 in greater detail.

FIG. 4 is an illustration of a first surface (30) of docking station 10 of FIGS. 1–3 in accordance with a preferred embodiment of the invention. In FIG. 4, the constituent parts of hinge 40 have been disconnected to show the detail of the hinge. Connector 35 can be seen as being embedded within first surface 30 of docking station 10. Further, flexible cable 52 emanates from slot 45 and is supplied to slot 47. Preferably, the length of flexible cable 52 includes sufficient service loop to allow the relative movement of the constituent parts of hinge without stressing the cable. This permits first surface 30 to rotate relative to slot 47 by way of hinge 40, without breaking electrical connections from connector 35 to the body of the docking station.

In a preferred embodiment, hinge 40 includes frictional surfaces 48 and 49 that hinder the relative motion of first surface 30 of docking station 10. This permits first surface 30 to be oriented at any angle from a substantially horizontal orientation to a substantially vertical orientation. In an alternate embodiment, hinge 40 includes a ratchet that consists of a wheel having inclined teeth into which a sliding bolt or pivoted tongue drops so that motion can be imparted, thereby permitting only motion of first surface 30 toward a vertical orientation. In either embodiment, a release mechanism is used to permit first surface 30 to return to a horizontal position.

Figure 5:
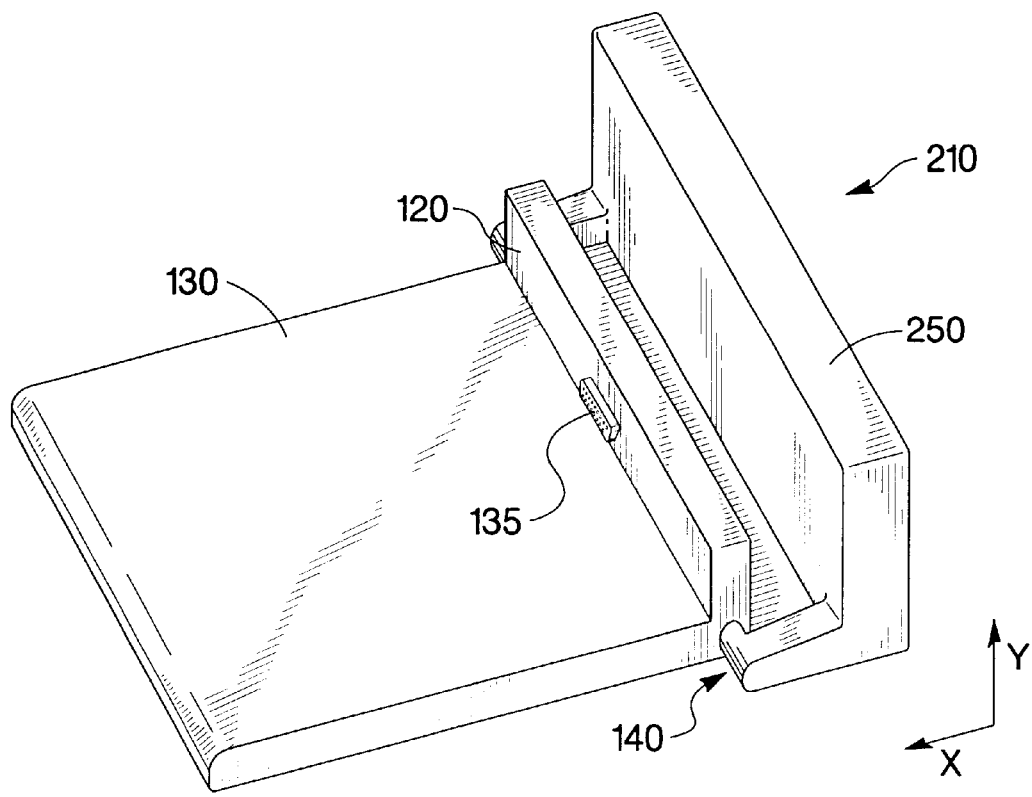
FIG. 5 shows a multi-position computing device docking station in accordance with an alternative embodiment of the invention.

FIG. 5 shows a multi-position computing device docking station in accordance with an alternate embodiment of the invention. In FIG. 5, connector 135 on rear wall 120 accepts a mating connector from a computing device that is supported by first surface 130. Preferably, first surface 130 and rear wall 120 rotate relative to body 250 of docking station 210. Further, hinge 140 includes a frictional surface that hinders the movement of first surface 130 and rear wall 120 in order to allow the computing device to be oriented at an angle between 0 and 90 degrees. Alternatively, hinged 140 may include other means for rotating the computing device and first surface 130, such as a wheel having inclined teeth into which a sliding bolt or pivoted tongue drops, as previously discussed in reference to FIG. 4.

Figure 6:
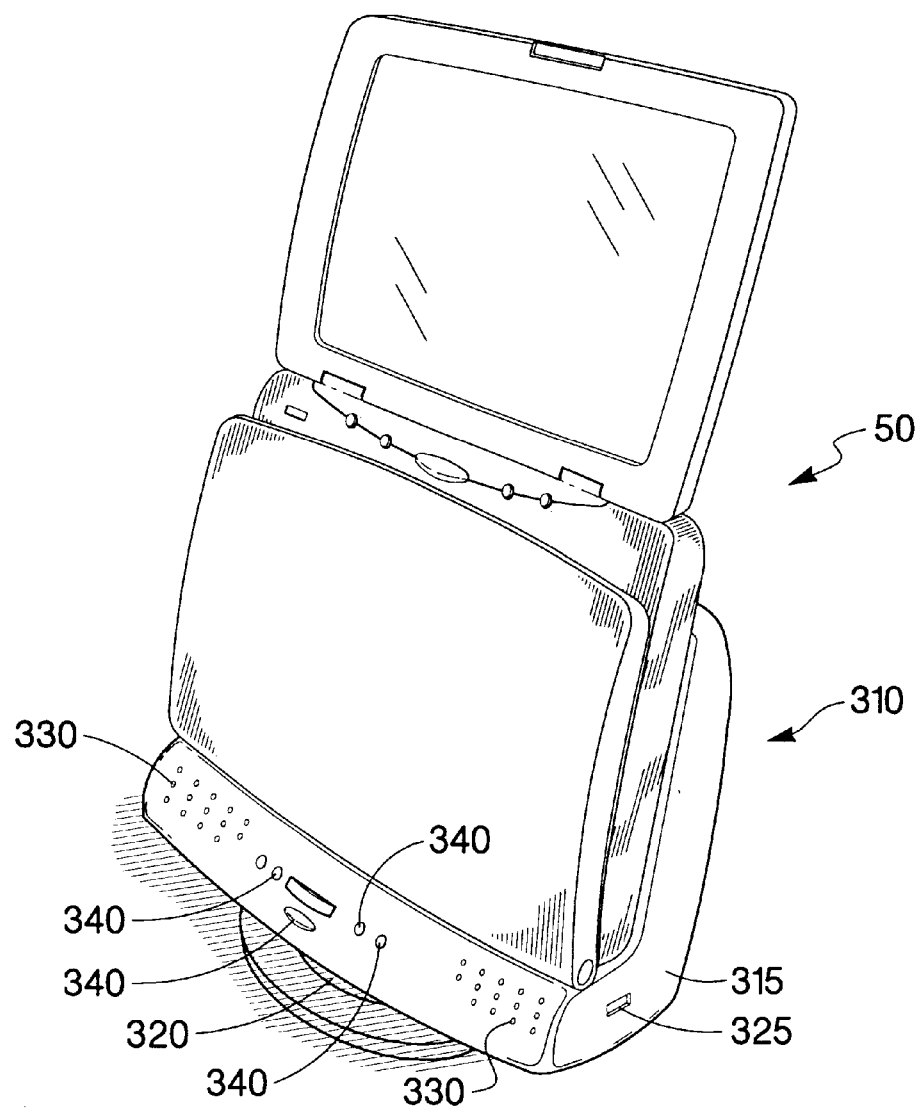
FIG. 6 shows a multi-position computing device docking station in accordance with an alternate embodiment of the invention.

FIG. 6 shows a multi-position computing device docking station in accordance with an alternate embodiment of the invention. In FIG. 6, docking station 310 accepts and confines the body of computing device 50, which is oriented in a substantially vertical direction. The display of computing device 50 is coupled to the body of the computing device by way of a standard hinge. Thus, the display portion of the portable computing device is free to rotate about the body of computing device 50. Due to the substantially vertical orientation of portable computing device 50 and the ability for the display to be positioned at a location that is above the body of the device, the display of FIG. 6 can be operated in manner that is more ergonomically attractive to the user. The user can make further adjustments to the display-viewing angle by way of the hinge that joins the display of FIG. 6 to the body of the portable computing device.

The multi-position computing device docking station of FIG. 6 includes docking station trunk 315, which joins the front and rear opposing surfaces. Further included is swivel 320, coupled to docking station trunk 315, for orienting the front and rear opposing surfaces in a horizontal plane. The use of swivel 320 enables the docking station of FIG. 6 to be easily aligned in a particular direction in order to make the most efficient use of available desktop space. Preferably, the rear surface docking station of FIG. 6 also includes a hook adapted to bind to a recessed cavity on a bottom surface of the computing device. It is also desired that the bottom surface include a connector for conveying at least one signal from the docking station to the computing device.

Docking station trunk 315 can also include at least one audio speaker (330) for presenting audio to a user as well as indicators 340 for displaying the operating status of the computing device. Docking station trunk 315 also includes port 325 to which an external device, such as a keyboard or other device can be plugged into. A wireless transceiver can also be incorporated in to docking station trunk 315 to enable communication with an external device such as a wireless keyboard, wireless peripheral device, or wireless mouse.

In conclusion, a multi-position portable computing device docking station enables a portable computing device to consume reduced desktop space and thus be operated in business and home computing environments that offer only limited desk space. This allows a user to make use of the portable computing device in the traditional manner, in which the device is inserted into a docking station and operated while oriented horizontally, as well as allowing the user to use the portable computing device with a separate keyboard and display, while the portable computing device is oriented vertically. In an alternate embodiment, the portable computing device can be operated while oriented in a substantially vertically with the display above the computing device. Through the use of the multi-position device docking station, the portable computing device can be efficiently and ergonomically used in many business and home computing environments where desktop space is limited.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It should be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A docking station comprising:

a first surface supporting a bottom surface of a portable computing device, said first surface including means for restricting movement of said portable computing device;

a body that interfaces said portable computing device with an external device; and a hinge which joins said first surface to said body, said hinge permitting said portable computing device to be rotated between a horizontal and a vertical orientation, wherein said first surface supporting said portable computing device is adjustable to a vertical orientation so that the desktop area consumed by said body and said first surface supporting said portable computing device is substantially less than the desktop area consumed by the body and a horizontally-oriented portable computing device.

2. The docking station of claim 1 wherein said first surface further comprises a connector for conveying a signal from said portable computing device to said first surface of said docking station.

3. The docking station of claim 2 further comprising a flexible cable for conveying said signal from said first surface of said docking station to said body of said docking station.

4. The docking station of claim 1 wherein said hinge includes a frictional surface that hinders the relative motion of adjacent surfaces of said hinge, thereby permitting said portable computing device to be oriented at an angle between said horizontal and said vertical orientation.

5. A docking station adapted to position a computing device to a vertical orientation, comprising:

means for receiving said computing device on a horizontal surface;

means for retaining said computing device on said horizontal surface; and means for rotating said computing device and said horizontal surface to a vertical orientation, wherein the desktop area consumed by said substantially vertically-oriented horizontal surface retaining said computing device and a body of said docking station is less than the desktop area consumed by said body of said docking station and a horizontally-oriented computing device.

6. The docking station of claim 5 further comprising means for conveying signals from said computing device to a display unit, wherein said display unit is separate from a display unit of said computing device.

7. The docking station of claim 5 further comprising means for conveying signals from a keyboard to said computing device, wherein said keyboard is separate from a keyboard of said computing device.

8. The docking station of claim 5 further comprising means for stopping said rotating of said computing device when said horizontal surface has reached said substantially vertical orientation.

9. The docking station of claim 5 wherein said computing device is a laptop computer.

10. A method for positioning a computing device in a multi-position docking station, the method comprising:

sliding said computing device along a substantially horizontal surface of said multi-position docking station;

retaining said computing device on said horizontal surface; and rotating said computing device and said substantially horizontal surface to a substantially vertical orientation by way of a hinge that couples said substantially horizontal surface to a body, wherein said body interfaces said portable computing device to an external device, and wherein the desktop area consumed by said body and said vertically-oriented horizontal surface retaining said portable computing device is substantially less than the desktop area consumed by the body and a horizontally-oriented portable computing device.

11. The method of claim 10 wherein said external device is a display unit.

12. The method of claim 10 wherein said external device is a keyboard.

13. The method of claim 10 wherein said rotating action further comprises stopping when said computing device has reached a substantially vertical position.

14. The method of claim 10 wherein said rotating action further comprises stopping when said computing device has reached an orientation which is less than 90 degrees with a horizontal surface.

* * * * *